(12) United States Patent
Sakabe

(10) Patent No.: US 9,483,104 B2
(45) Date of Patent: Nov. 1, 2016

(54) IMAGE FORMING APPARATUS AND RESPONSE METHOD TO EFFECTIVELY SWITCH BETWEEN A NORMAL MODE AND A STANDBY MODE FOR ENERGY SAVINGS

(71) Applicant: KYOCERA Document Solutions Inc., Osaka (JP)

(72) Inventor: Keiji Sakabe, Osaka (JP)

(73) Assignee: KYOCERA Document Solutions Inc. (JP)

( * ) Notice: Subject to any disclaimer, the term of this patent is extended or adjusted under 35 U.S.C. 154(b) by 86 days.

(21) Appl. No.: 14/601,417

(22) Filed: Jan. 21, 2015

(65) Prior Publication Data

US 2015/0212574 A1 Jul. 30, 2015

(30) Foreign Application Priority Data

Jan. 24, 2014 (JP) .................. 2014-011032

(51) Int. Cl.
*G06F 1/00* (2006.01)
*G06F 1/32* (2006.01)

(52) U.S. Cl.
CPC .......... *G06F 1/3287* (2013.01); *Y02B 60/1282* (2013.01)

(58) Field of Classification Search
CPC ....................................................... G06F 1/32
See application file for complete search history.

(56) References Cited

U.S. PATENT DOCUMENTS

| | | | | |
|---|---|---|---|---|
| 7,698,404 B2* | 4/2010 | Sugimoto | ............. | G06F 3/1204 709/203 |
| 2009/0225357 A1* | 9/2009 | Miyake | .............. | H04N 1/00885 358/1.15 |
| 2011/0188075 A1* | 8/2011 | Narushima | ........... | G06F 1/3284 358/1.15 |
| 2011/0292446 A1* | 12/2011 | Kojima | .............. | G03G 15/5004 358/1.15 |
| 2013/0346574 A1* | 12/2013 | Singaraju | .............. | H04L 41/046 709/223 |

FOREIGN PATENT DOCUMENTS

JP 2010-094925 A 4/2010

* cited by examiner

*Primary Examiner* — Mohammed Rehman
(74) *Attorney, Agent, or Firm* — McDonnell Boehnen Hulbert & Berghoff LLP

(57) ABSTRACT

The image forming apparatus includes a first response unit and a second response unit. The first response unit transmits a response including information corresponding to a request in response to a request from a management, via a network. The second response unit includes a storage unit and a control unit. The storage unit stores an item name of the information and an item value corresponding to the item name. The control unit controls so as to restrict power supply to the first response unit and transfers to a second mode in which the second response unit transmits the response in place of the first response unit, when a condition for transferring from the preliminarily set first mode to the second mode is satisfied and an item value corresponding to the stored item name is stored in the storage unit.

3 Claims, 14 Drawing Sheets

| IP Address | MAC Address (Ethernet Address) |
|---|---|
| 192.168.0.123 | 00:C0:EE:AE:AB:C8 |

| No. | OID | Data | |
|---|---|---|---|
| | | Type | Data Value |
| 1 | 1.3.6.1.2.1.2.2.1.1.1 | INTEGER | 1 |
| 2 | 1.3.6.1.2.1.2.2.1.2.1 | STRING | eth0 |
| 3 | 1.3.6.1.2.1.2.2.1.3.1 | INTEGER | 6 |
| 4 | 1.3.6.1.2.1.2.2.1.4.1 | INTEGER | 1500 |
| 5 | 1.3.6.1.2.1.2.2.1.5.1 | Gauge32 | 0 |
| ...... | ...... | ...... | ...... |

Related Art 2

IMAGE FORMING APPARATUS AND RESPONSE METHOD TO EFFECTIVELY SWITCH BETWEEN A NORMAL MODE AND A STANDBY MODE FOR ENERGY SAVINGS

INCORPORATION BY REFERENCE

This application is based on, and claims priority to corresponding Japanese Patent Application No. 2014-011032, filed in the Japan Patent Office on Jan. 24, 2014, the entire contents of which are incorporated herein by reference.

FIELD

Unless otherwise indicated herein, the description in this field section, the background section, or in figures and accompanying text that reference "related art" is not prior art to the claims in this application and is not admitted to be prior art by inclusion in this section, unless specified otherwise. The present disclosure relates to an image forming apparatus that receives information request data and transmits response data for the information request data.

BACKGROUND

A typical image forming apparatus such as a printer or a multifunction peripheral (MFP) transfers to a state ("standby mode") for energy saving, as energy-saving measures, if a preliminarily set time has elapsed in a state in which a user does not use the image forming apparatus. However, once the image forming apparatus transfers to the standby mode, it takes time to be put back into a state ("normal mode") in which the user can use the image forming apparatus.

If, for example, a client apparatus transmits, to the image forming apparatus in the standby mode via a network, information request data for confirming information of the image forming apparatus, the image forming apparatus transfers from the standby mode to the normal mode and transmits response data, which takes time. Therefore, transmitting information request data from the client apparatus multiple times throughout a day results in a corresponding increase in transitions from the standby mode to the normal mode, which reduces the amount of time of being in the standby mode, thereby reducing an energy-saving effect.

To combat this, one image process apparatus enables response data to be transmitted even in the standby mode. Such an image process apparatus includes a controller having two Central Processing Units (CPUs), with a main CPU responding in a normal mode and a sub CPU responding in a sleep mode.

In the normal mode, the main CPU stores response data in a random access memory (RAM) in the main CPU. At the time of transferring to the sleep mode, the sub CPU acquires a piece of response data, whose frequency of use is high, from the RAM in the main CPU and stores the piece of response data in a RAM in the sub CPU.

As described above, at the time of transferring from the normal mode to the sleep mode, the piece of response data whose frequency of use is high is stored in the RAM in the sub CPU. Therefore, the above-described image process apparatus can generate and transmit a piece of response data using data stored in the RAM in the sub CPU by the sub CPU in the sleep mode.

However, it is necessary for the above-described image process apparatus to preliminarily store pieces of response data in the RAM in the main CPU in the normal mode, and it is necessary for the sub CPU to acquire a piece of response data whose frequency of use is high from among the pieces of response data stored in the RAM in the main CPU when the image process apparatus transfers to the sleep mode and to transfer the acquired response data to the RAM in the sub CPU. As a result, there is an accompanying delay before the transition to the sleep mode.

SUMMARY

The present disclosure relates to an image forming apparatus and a response method capable of effectively switching between the normal mode and the standby mode.

According to the present disclosure, an image forming apparatus includes a first response unit and a second response unit.

The first response unit transmits a response including information corresponding to a kind of each request in response to one or more kinds of requests received from a management tool that manages the image forming apparatus, via a network.

The second response unit includes a storage unit and a control unit.

The storage unit stores therein an item name of the information and an item value corresponding to the item name.

The control unit (i) defines a request used in common by various types of management tool and causes the item name corresponding to the request to be stored in the storage unit, (ii) acquires and causes a piece of information corresponding to the stored item name to be stored, as the item value, in the storage unit, from among the information included in the response transmitted by the first response unit at the time of a first mode in which the first response unit is operated, and (iii) controls so as to restrict power supply to the first response unit and transfers to a second mode in which the second response unit itself transmits the response in place of the first response unit, in a case where a condition for transferring from the preliminarily set first mode to the second mode is satisfied and an item value corresponding to the stored item name is stored in the storage unit.

Additional features and advantages are described herein, and will be apparent from the following Detailed Description and the figures.

BRIEF DESCRIPTION OF FIGURES

All drawings are intended to illustrate some aspects and examples of the present disclosure. The drawings described are only schematic and are non-limiting, and are not necessarily drawn to scale.

FIG. 2A is a schematic diagram illustrating an example of an address information area of the first image forming apparatus;

FIG. 2B is a schematic diagram illustrating an example of an SNMP response information table of the first image forming apparatus;

DETAILED DESCRIPTION

Various embodiments are described below with reference to the figures. It should be understood, however, that numerous variations from the depicted arrangements and functions are possible while remaining in the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

A first typical image forming apparatus on which the present embodiment is based includes a host system (a first response unit) and a standby response system (a second response unit). In addition, the image forming apparatus has a normal mode (a first mode) in which all the functions of the host system and the standby response system operate, and a standby mode (a second mode) in which power supply to the host system is restricted so as to achieve electric power saving and only the standby response system operates.

In the normal mode, the host system responds with response data (a response) corresponding to information request data (a request) sent from a personal computer (PC) serving as a client apparatus. In the standby mode, the standby response system responds with response data.

At the time of being in the normal mode, the standby response system stores therein information for creating response data so as to respond even in the standby mode.

At the time of the standby mode, the standby response system uses the information stored at the time of creating the response data. Therefore, when the image forming apparatus transfers from the normal mode to the standby mode, it becomes unnecessary to transfer the information from the host system to the standby response system, and it is possible to reduce a time taken to transfer to the standby mode.

In addition, in the standby mode, the standby response system generates response data using the stored information and transmits the generated response data to the client apparatus serving as the transmission source of the information request data. In addition, if, at the time of the standby mode, it is difficult for the standby response system to generate response data from the preliminarily stored information, the image forming apparatus transfers from the standby mode to the normal mode.

Figure 1:
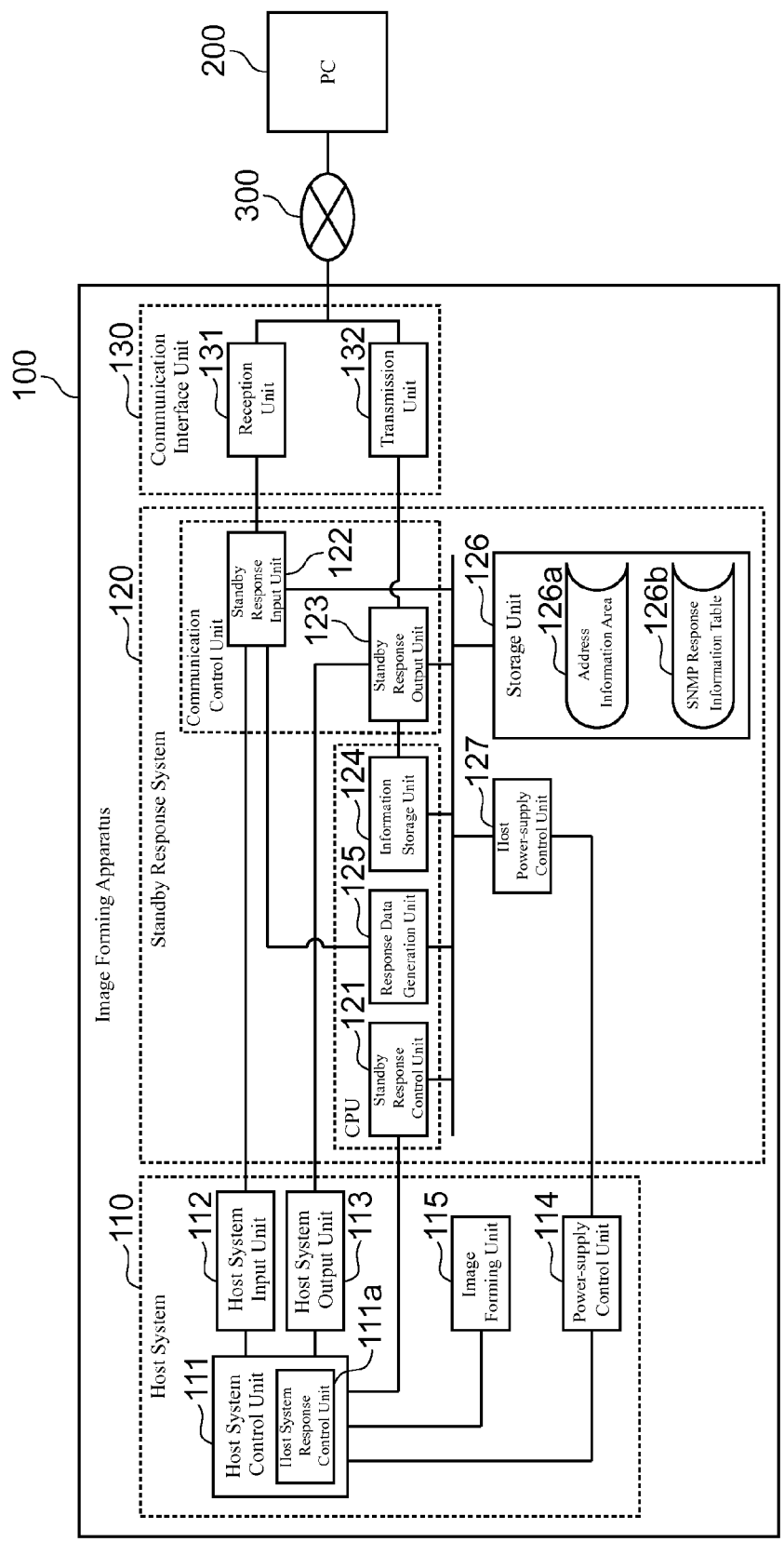
FIG. 1 is a schematic diagram illustrating a block configuration of a first typical image forming apparatus.

The configuration of the first typical image forming apparatus will be described. FIG. 1 is a schematic diagram illustrating the configuration of a first typical image forming apparatus 100. The image forming apparatus 100 communicates with a PC 200 serving as the client apparatus via a network 300, thereby transferring information request data and response data therebetween.

The image forming apparatus 100 is an image forming apparatus serving as a printer, a multifunction printer, a multifunction peripheral apparatus, or an MFP such as a multifunction machine or is an apparatus that receives information request data via the network 300 and transmits response data corresponding to the information request data. The PC 200 is the client apparatus that transmits the information request data to the image forming apparatus 100 and receives the response data for the information request data.

The image forming apparatus 100 includes a host system 110, a standby response system 120, and a communication interface unit 130.

When the image forming apparatus 100 is in the normal mode, the host system 110 receives the information request data and transmits the response data corresponding to the information request data. In addition, when the image forming apparatus 100 is in the standby mode, power supply is restricted and the host system 110 terminates the function thereof.

The host system 110 includes a host system control unit 111 (a control unit), a host system input unit 112, a host system output unit 113, a power-supply control unit 114 (the control unit), and an image forming unit 115.

The host system control unit 111 includes memories such as a RAM and a ROM and a control unit such as a central processing unit (CPU). The host system control unit 111 includes a host system response control unit 111a. The host system response control unit 111a performs various kinds of control of the standby response system 120 and sends, to the standby response system 120, a request for a transition to the standby mode so as to cause the image forming apparatus 100 to transfer to the standby mode.

The host system input unit 112 receives the information request data transmitted from the standby response system 120.

The host system output unit 113 transmits the response data to the standby response system 120.

The power-supply control unit 114 supplies electric power to all units in the host system 110. In addition, if the power supply is turned on by control from the standby response system 120, electric power is supplied to all the units. Or if the power supply is turned off, supply of electric power to all the units is terminated.

Based on an instruction or the like from the PC 200, the image forming unit 115 forms and transmits an image.

At the time of the normal mode, the standby response system 120 receives, to the host system 110, the information request data input from the communication interface unit 130 and transmits, to the communication interface unit 130, the response data input from the host system 110. At the time of the standby mode, the standby response system 120 generates the response data corresponding to the information request data input from the communication interface unit 130 and transmits the generated response data to the communication interface unit 130.

The standby response system 120 includes a standby response control unit 121 (the control unit), a standby response input unit 122, a standby response output unit 123, an information storage unit 124, a response data generation unit 125, a storage unit 126, and a host power-supply control unit 127 (the control unit), each of which are connected together via a bus.

The standby response control unit 121 includes memories such as a RAM and a ROM. In addition, the standby response control unit 121, the response data generation unit 125, and the information storage unit 124 are functional blocks realized by the CPU executing a program. In addition, a communication control unit is configured by the standby response input unit 122 and the standby response output unit 123.

The standby response input unit 122 receives the information request data transmitted from the communication interface unit 130.

The standby response output unit 123 transmits the response data to the communication interface unit 130 and the information storage unit 124.

The information storage unit 124 stores therein the information of the response data transmitted from the host system 110 to the communication interface unit 130 via the standby response output unit 123.

When the image forming apparatus 100 is in the standby mode, the response data generation unit 125 generates the response data corresponding to the information request data and responds therewith.

The storage unit 126 includes a hard disk drive (HDD), a flash memory, or the like and includes an address information area 126a and an SNMP response information table 126b. The configurations of the address information area 126a and the SNMP response information table 126b will be described later. In addition, at the time of activation of the image forming apparatus 100, no information is set in the SNMP response information table 126b.

The host power-supply control unit 127 controls so as to turn on or turn off the power-supply control unit 114 in the host system 110. When, for example, the image forming apparatus 100 transfers from the standby mode to the normal mode, the power-supply control unit 114 is instructed to resume power supply to the host system 110.

The communication interface unit 130 is equipped with an attachable and detachable local area network (LAN) interface for connecting to the network 300. The communication interface unit 130 includes a reception unit 131 and a transmission unit 132.

When receiving a packet of the information request data transmitted from the PC 200, the reception unit 131 transmits the information request data to the standby response system 120.

When inputting the response data from the standby response system 120, the transmission unit 132 transmits a packet of the response data to the PC 200.

Next, the configurations of the address information area 126a and the SNMP response information table 126b provided in the storage unit 126 in the standby response system 120 will be described. FIG. 2A is a tabular diagram illustrating an example of the address information area 126a and FIG. 2B is a tabular diagram illustrating an example of the SNMP response information table 126b.

First, the configuration of the address information area 126a will be described. In the address information area 126a, the items of "IP address" and "MAC address (Ethernet address)" are provided. In the "IP address", the IP address of the image forming apparatus 100 to be set in the response data is preliminarily stored. In the "MAC address", a MAC address corresponding to the IP address of the image forming apparatus 100 to be set in the response data is preliminarily stored.

Next, the configuration of the SNMP response information table 126b will be described. In the SNMP response information table 126b, the information of the response data for the information request data specified by a simple network management protocol (SNMP) is stored. In the SNMP response information table 126b, the items of "No.", "Object Identifier (OID)", and "data" are provided. The "No." is an ascending number to be assigned to a combination of the "OID" and the "data" corresponding thereto.

In the "OID" (an item name), an identifier assigned in order to distinguish an object of individual piece of management information stored in a management information base (MIB) specified by the SNMP is saved. In the "data", data for the "OID" to be set in the response data is saved. In addition, in the "data", the items of "type" and "data value" (an item value) are provided, and the type of the "data value" is saved in the "type". If the type of the "data" is, for example, an integer number, "INTEGER" is saved. In the "data value", an actual data value is saved.

Next, the flow of process in the first typical image forming apparatus 100 will be described. Hereinafter, the flow of process will be divided into four main process operations and described. The four process operations are "the flow of process in the normal mode", "the flow of process for transferring from the normal mode to the standby mode", "the flow of process in the standby mode", and "the flow of process for transferring from the standby mode to the normal mode". In addition, the image forming apparatus 100 is put into the normal mode at the time of the activation thereof.

Figure 3:
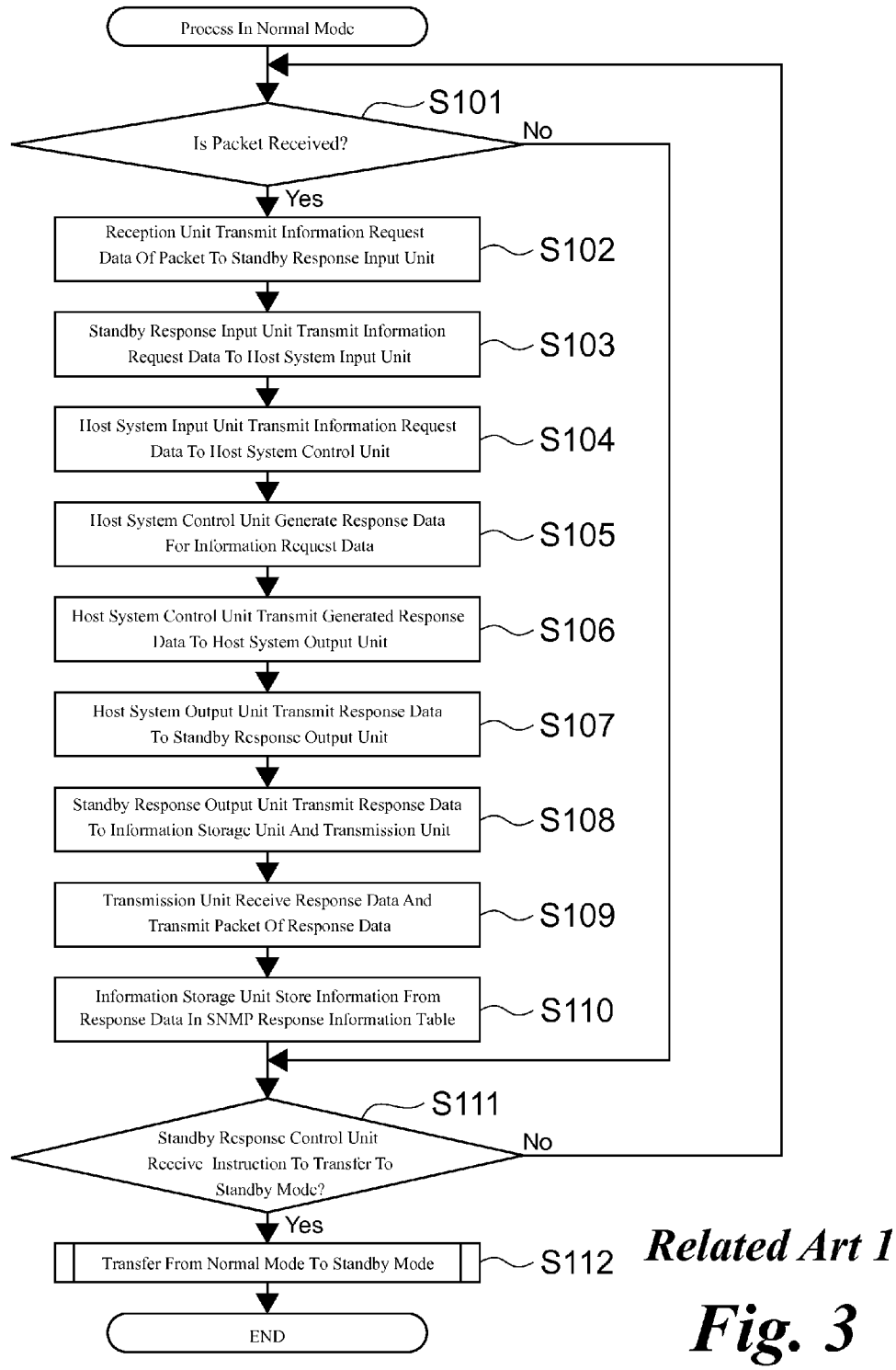
FIG. 3 is a flowchart of a process in a normal mode in the first image forming apparatus.

The flow of process in the normal mode will be described. FIG. 3 is the flowchart of the process in the normal mode.

(Step S101)

First, the reception unit 131 determines whether a packet is received. If the packet is received (step S101: Yes), the process proceeds to a step S102. If no packet is received (step S101: No), the process proceeds to a step S111.

(Step S102)

If Yes in the step S101, the reception unit 131 transmits the information request data of the packet to the standby response input unit 122.

(Step S103)

Next, upon inputting the information request data, the standby response input unit 122 transmits the information request data to the host system input unit 112.

(Step S104)

Next, upon inputting the information request data, the host system input unit 112 transmits the information request data to the host system control unit 111.

(Step S105)

Next, upon inputting the information request data, the host system control unit 111 generates the response data for the information request data.

(Step S106)

Next, the host system control unit 111 transmits the generated response data to the host system output unit 113.

(Step S107)

Next, upon inputting the response data, the host system output unit 113 transmits the response data to the standby response output unit 123.

(Step S108)

Next, upon inputting the response data, the standby response output unit 122 transmits the response data to the information storage unit 124 and the transmission unit 132.

(Step S109)

Next, the transmission unit 132 receives the response data and transmits a packet of the response data to a transmission destination via the network 300. As for, for example, a packet of the response data for the information request data of a packet received from the PC 200, the packet is transmitted to the PC 200.

(Step S110)

Next, the information storage unit 124 receives the response data, and if the response data is the response data of the SNMP, the information storage unit 124 acquires the "OID" and the "data" from the response data and stores the "OID" and the "data" in the SNMP response information table 126b.

(Step S111)

Returning to the step S110, if No in the step S101, it is determined whether the standby response control unit 121 receives, from the host system response control unit 111a, an instruction to transfer to the standby mode. If the instruction to transfer to the standby mode is received (step S111: Yes), the process proceeds to a step S112. If no instruction to transfer to the standby mode is received (step S111: No), the process returns to the step S101. In addition, if a preliminarily set time has elapsed (a first condition) or if a user issues an instruction (the first condition), the host system response control unit 111a transmits, to the standby response control unit 121, the instruction to transfer to the standby mode.

(Step S112)

When the instruction to transfer to the standby mode is received (step S111: Yes), the host system control unit 111 and the standby response control unit 121 perform a process for transferring from the normal mode to the standby mode.

Figure 4:
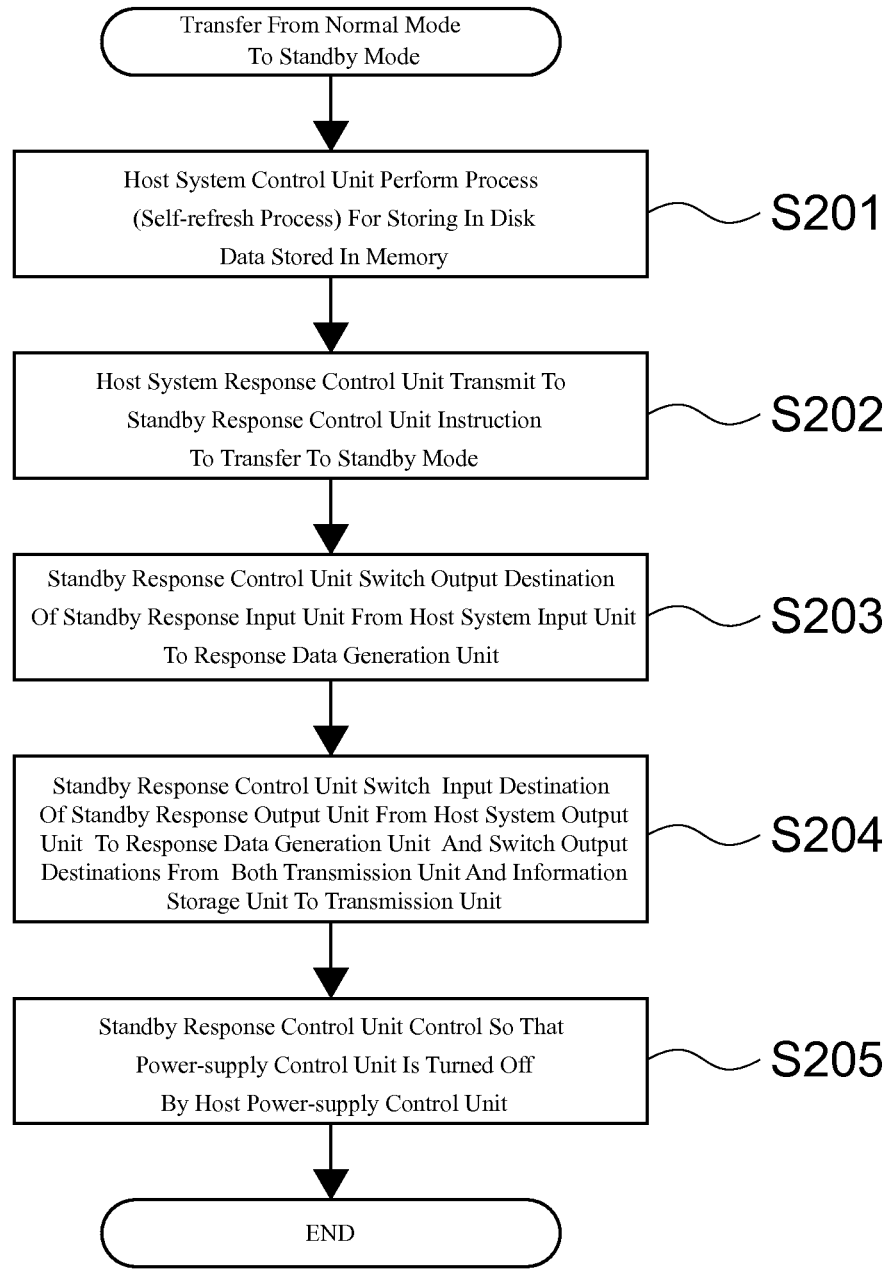
FIG. 4 is a flowchart of a process for transferring from the normal mode to a standby mode in the first image forming apparatus.

Next, the flow of the process for transferring from the normal mode to the standby mode will be described. FIG. 4 is the flowchart of the process for transferring from the normal mode to the standby mode.

(Step S201)

First, the host system control unit 111 performs a process (self-refresh process) for storing, in a disk (not illustrated), data stored in the memory of the host system control unit 111.

(Step S202)

Next, the host system response control unit 111a transmits, to the standby response control unit 121, the instruction to transfer to the standby mode.

(Step S203)

Next, the standby response control unit 121 switches the output destination of the standby response input unit 122 from the host system input unit 112 to the response data generation unit 125.

(Step S204)

Next, the standby response control unit 121 switches the input destination of the standby response output unit 123 from the host system output unit 113 to the response data generation unit 125 and switches output destinations from both the transmission unit 132 and the information storage unit 124 to only the transmission unit 132.

(Step S205)

Next, the standby response control unit 121 controls so that the power-supply control unit 114 is turned off by the host power-supply control unit 127, and terminates the standby-mode-transition process. In this way, the power-supply control unit 114 is turned off, thereby terminating supply of electric power and transferring to the standby mode.

Figure 5:
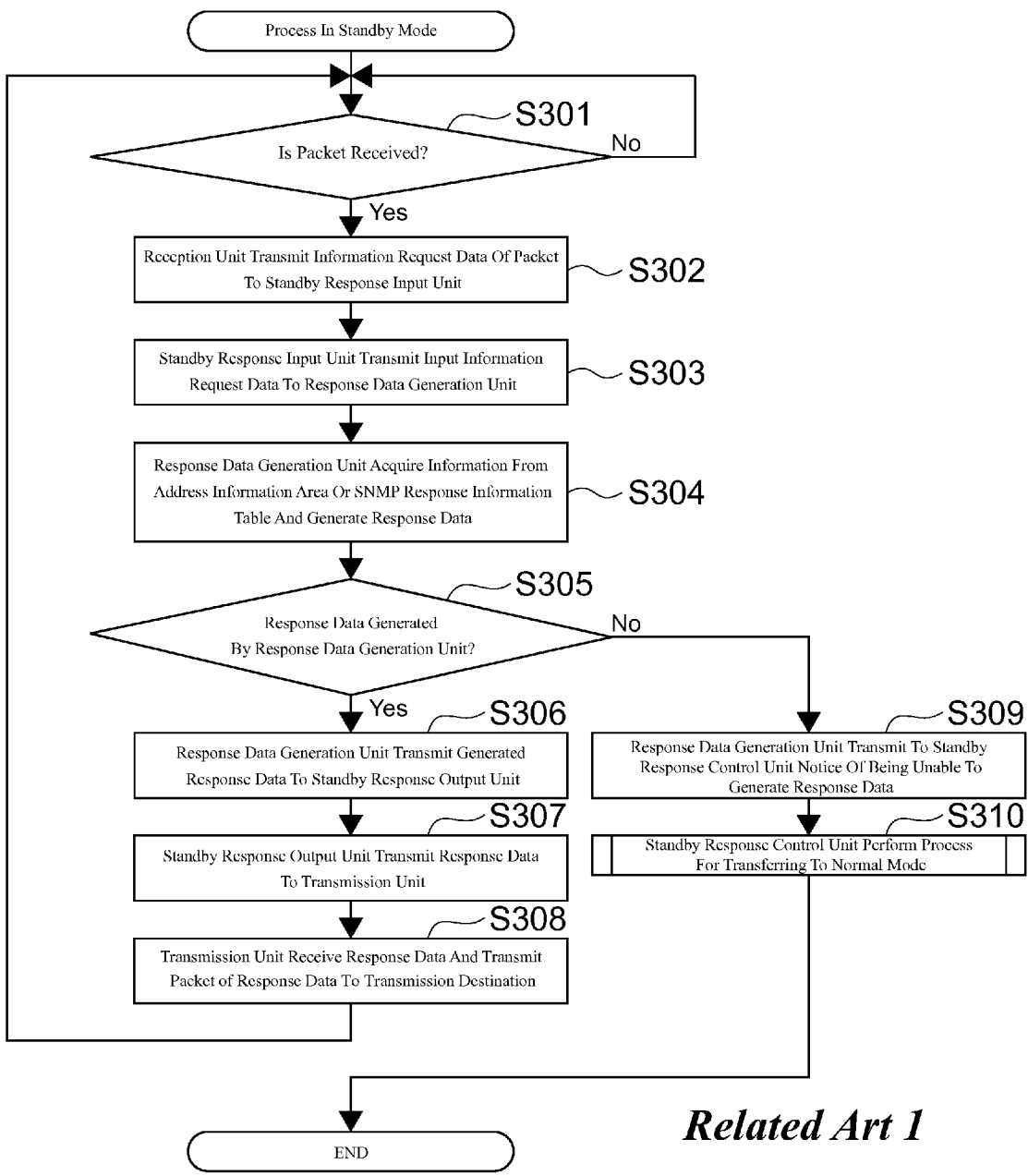
FIG. 5 is a flowchart of a process in the standby mode in the first image forming apparatus.

Next, the flow of a process in the standby mode will be described. FIG. 5 is the flowchart of the process in the standby mode.

(Step S301)

First, the reception unit 131 determines whether a packet is received. If the packet is received (step S301: Yes), the process proceeds to a step S302. If no packet is received (step S301: No), the process returns to the step S301.

(Step S302)

If Yes in the step S301, the reception unit 131 transmits the information request data of a packet to the standby response input unit 122.

(Step S303)

Next, the standby response input unit 122 transmits the input information request data to the response data generation unit 125. In addition, in the standby-mode-transition process, the output destination of the standby response input unit 122 is switched to the response data generation unit 125.

(Step S304)

Next, the response data generation unit 125 acquires information from the address information area 126a or the SNMP response information table 126b and generates the response data.

(Step S305)

Next, it is determined whether the response data is generated by the response data generation unit 125. If the response data is generated (step S305: Yes), the process proceeds to a step S306. If no response data is generated (step S305: No), the process proceeds to a step S309. In addition, as a case where the response data is not generated, for example, a case where information in the address information area 126a or the SNMP response information table 126b is insufficient, a case where response data other than the response data specified by an address resolution protocol (ARP) or the SNMP is generated, and so forth may be cited.

(Step S306)

If Yes in the step S305, the response data generation unit 125 transmits the generated response data to the standby response output unit 123.

(Step S307)

Next, upon inputting the response data, the standby response output unit 123 transmits the response data to the transmission unit 132.

(Step S308)

Next, the transmission unit 132 receives the response data and transmits a packet of the response data, to a transmission destination via the network 300. As for, for example, a packet of the response data for the information request data of a packet received from the PC 200, the packet is transmitted to the PC 200.

(Step S309)

If No in the step S305, the response data generation unit 125 transmits, to the standby response control unit 121, a notice of being unable to generate the response data.

(Step S310)

Next, the standby response control unit 121 performs process for a transferring to the normal mode.

In addition, in the above description, a transition to the normal mode is made in a case where no response data is generated (step S305: No). However, without limitation to this configuration, a configuration may be adopted in which the image forming apparatus 100 discards the received information request data and continues the standby mode in a case where it is difficult to generate response data.

Figure 6:
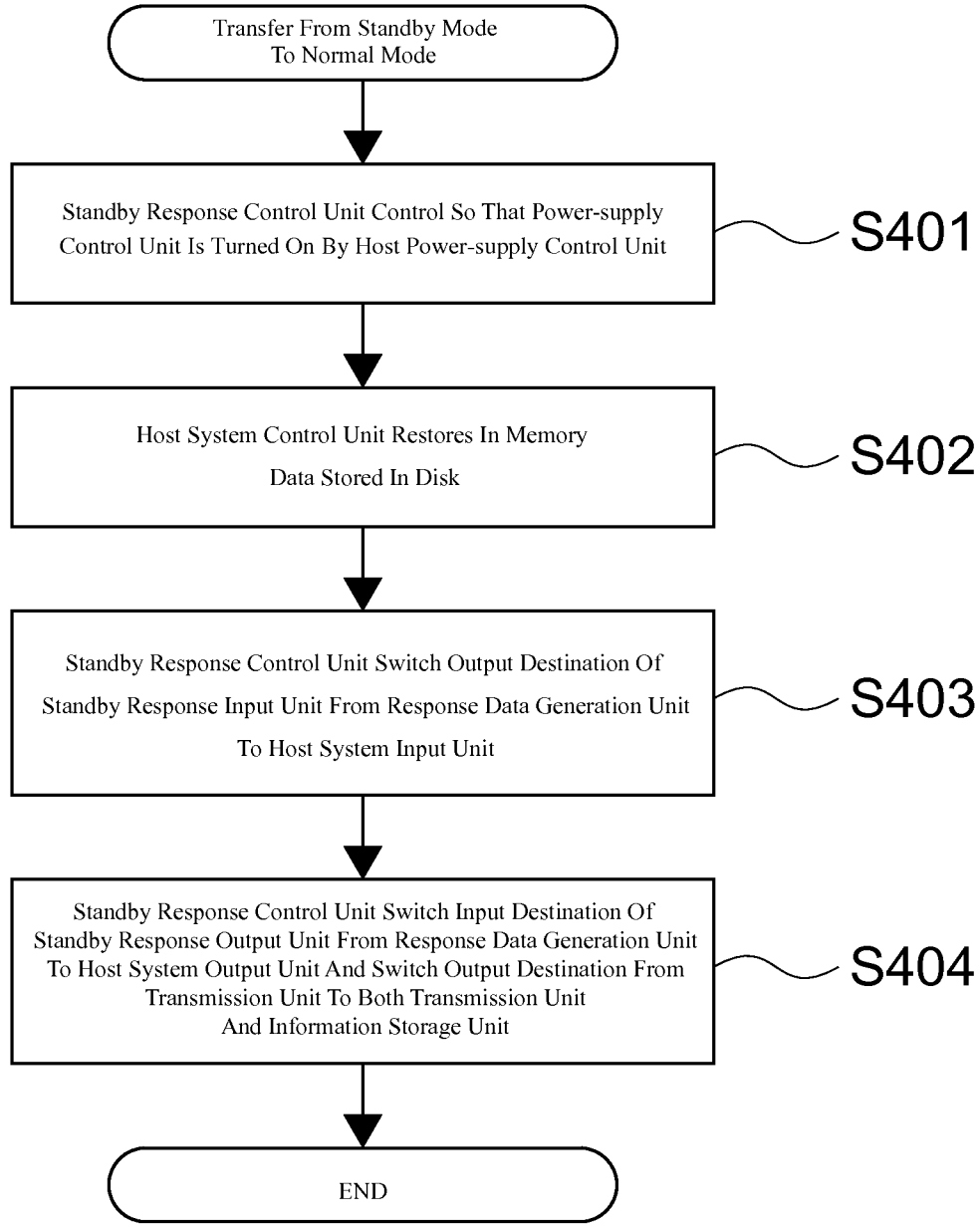
FIG. 6 is a flowchart of a process for transferring from the standby mode to the normal mode in the first image forming apparatus.

Next, the flow of a process for transferring from the standby mode to the normal mode will be described. FIG. 6 is the flowchart of the process for transferring from the standby mode to the normal mode.

(Step S401)

First, the standby response control unit 121 controls so that the power-supply control unit 114 is turned on by the host power-supply control unit 127. The power-supply control unit 114 is turned on, thereby starting supply of electric power to the host system 110.

(Step S402)

Next, the host system control unit 111 restores, in the memory, data saved in the disk.

(Step S403)

Next, the standby response control unit 121 switches the output destination of the standby response input unit 122 from the response data generation unit 125 to the host system input unit 112.

(Step S404)

Next, the standby response control unit 121 switches the input destination of the standby response output unit 123 from the response data generation unit 125 to the host system output unit 113, switches an output destination from only the transmission unit 132 to both the transmission unit 132 and the information storage unit 124, and terminates the normal-mode-transition process.

As described above, the first typical image forming apparatus 100 acquires and stores information necessary for a response at the time of the normal mode and responds, based on the stored information, at the time of the standby mode. In a case where, at the time of creating the response data in the standby mode, the information necessary for the generation is insufficient, the image forming apparatus 100 returns to the normal mode and generates the response data.

In the image forming apparatus 100, if a transition to the standby mode is made with a timer or the like as a trigger before information sufficient for creating the response data is stored, frequent returns from the standby mode to the normal mode are generated. If the frequent returns are generated, a time during which the image forming apparatus 100 is in the standby mode is reduced, thereby preventing electric power saving of the image forming apparatus 100 from being achieved.

In addition, in a case of a configuration in which, at a time when the information request data where it is difficult to respond is received at the time of the standby mode, the data is discarded. If the stored information is insufficient, information request data to be discarded increases and responsiveness to the PC 200 at the time of the standby mode is deteriorated.

Therefore, in a second typical image forming apparatus, a configuration is adopted in which a condition to satisfy at the time of transferring to the standby mode is expressly set and a transition to the standby mode is made only in a case where the transition condition (a second condition) is satisfied.

Using this configuration, a useless transition to the standby mode is avoided and the normal mode is maintained, thereby improving a response speed for an information request from the PC 200. In addition, since, at the time of transferring to the standby mode, information available for the standby response system is satisfied, it is possible to respond to the information request from the PC 200.

Figure 7:
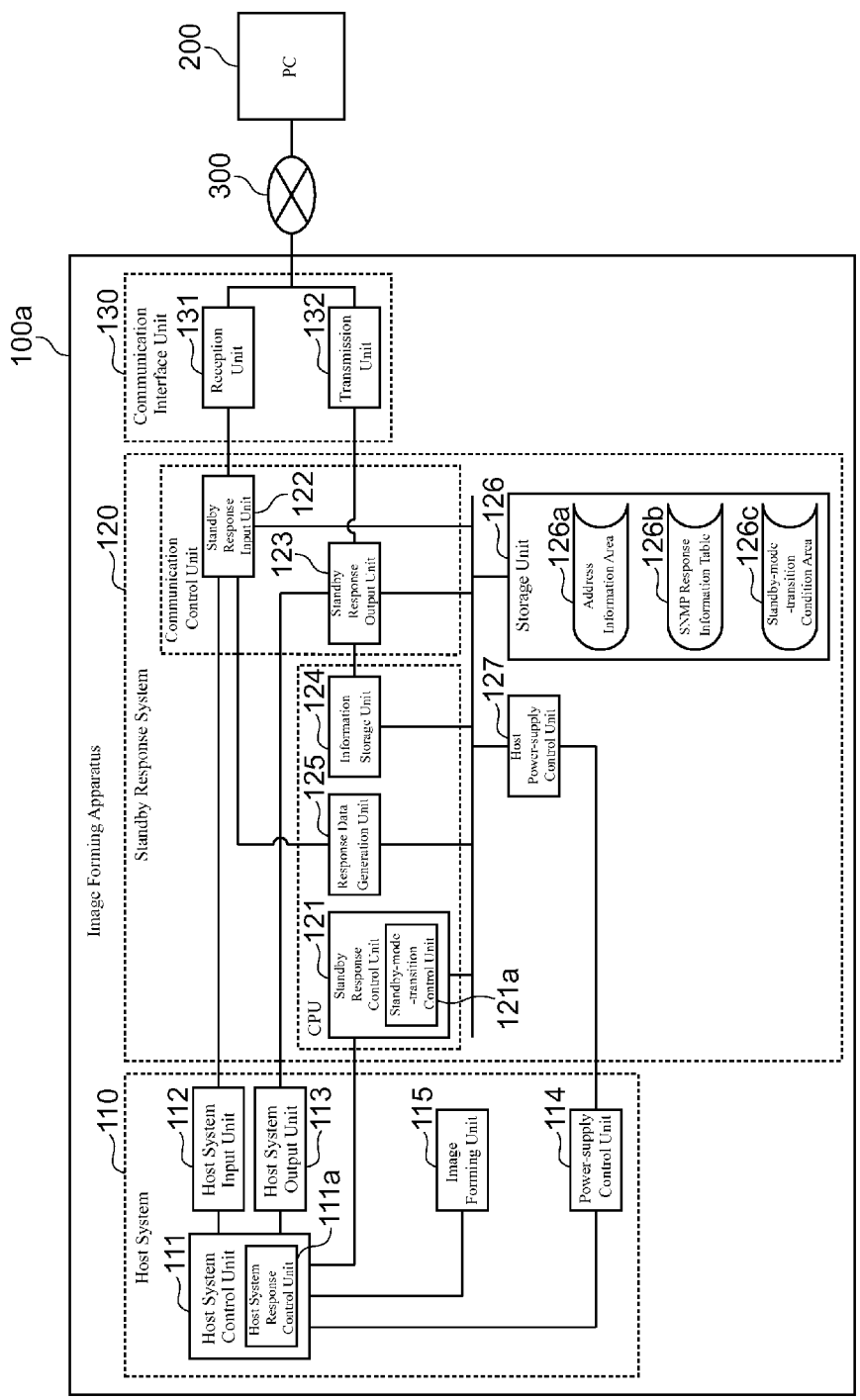
FIG. 7 is a schematic diagram illustrating a block configuration of a second typical image forming apparatus.

The configuration of the second typical image forming apparatus will be described. FIG. 7 is a diagram illustrating the configuration of the second typical image forming apparatus 100a. In FIG. 7, the same numbers are assigned to portions whose configuration is the same as that of the first typical image forming apparatus 100, and the description thereof will be omitted.

The second typical image forming apparatus 100a is different from the first typical image forming apparatus 100 in two points.

First, the standby response control unit 121 includes a standby-mode-transition control unit 121a (the control unit). When the image forming apparatus 100a tries to transfer from the normal mode to the standby mode, the standby-mode-transition control unit 121a determines whether or not information stored in the storage unit 126 satisfies a standby-mode-transition condition.

Second, the storage unit 126 stores therein a standby-mode-transition condition area 126c in addition to the address information area 126a and the SNMP response information table 126b.

The standby-mode-transition condition will now be described. At the time of the normal mode, the standby-mode-transition condition is preliminarily set by the host system 110 for the standby response system 120. In addition, when the host system 110 does not expressly perform a setting at the time of the normal mode, default values such as factory settings are set as the standby-mode-transition condition.

As the standby-mode-transition condition, several levels may be set. The standby-mode-transition condition at a minimum required level is "an IP address and a MAC address are stored". This condition may be set as the default value of the standby-mode-transition condition.

As a condition at a level stricter than the condition at the minimum required level (and requiring storing of more information), that information used for a response in the SNMP is stored in addition to the minimum required level may be set as a condition. If the condition at this level is set as the standby-mode-transition condition, a transition to the standby mode turns out not to be made in a case where there is no information in the SNMP response information table 126b. If such a condition at this level is set, it is possible to secure responsiveness to an information request in network management utilizing the SNMP.

As levels set in regard to the SNMP, some possible examples include: (1) a level where information necessary for the PC 200 to confirm whether the image forming apparatus 100a is online or offline is stored, (2) a level where information necessary for a utility or the like that monitors the state of the image forming apparatus 100a and which gives notice of a state change is stored, (3) a level where information necessary for a utility or the like used for setting and referencing the information of the image forming apparatus 100a is stored.

In this way, by selecting several levels with respect to the SNMP, it is possible to finely set conditions of transferring to the standby mode, and it is possible to enhance convenience for a user.

In addition, based on an instruction of the host system response control unit 111a, the standby-mode-transition condition is set in the standby-mode-transition condition area 126c by the standby-mode-transition control unit 121a.

The need to set a plurality of levels of the standby-mode-transition condition will be described.

A state in which the image forming apparatus 100a is in the standby mode for a relatively long time becomes an advantage for the user in terms of reduced power consumption. In contrast, when an information request is received in the standby mode where it is difficult to respond without returning to the normal mode arrives, there is a disadvantage in that it takes a long time for the image forming apparatus 100a to return from the standby mode to the normal mode, and responsiveness is deteriorated.

On the other hand, while the image forming apparatus 100a is in the normal mode, it advantageously has good responsiveness, but suffers from increased power consumption, compared to being in the standby mode.

In this way, an advantage and a disadvantage exist in each of a case where the image forming apparatus 100a is in the standby mode and a case where the image forming apparatus 100a is in the normal mode. Therefore, it becomes important to select the standby-mode-transition condition so as to balance the allocation of the state of the standby mode and the state of the normal mode, in consideration of these advantages and disadvantages. To that end, it is necessary to select the plural levels.

Figure 8:
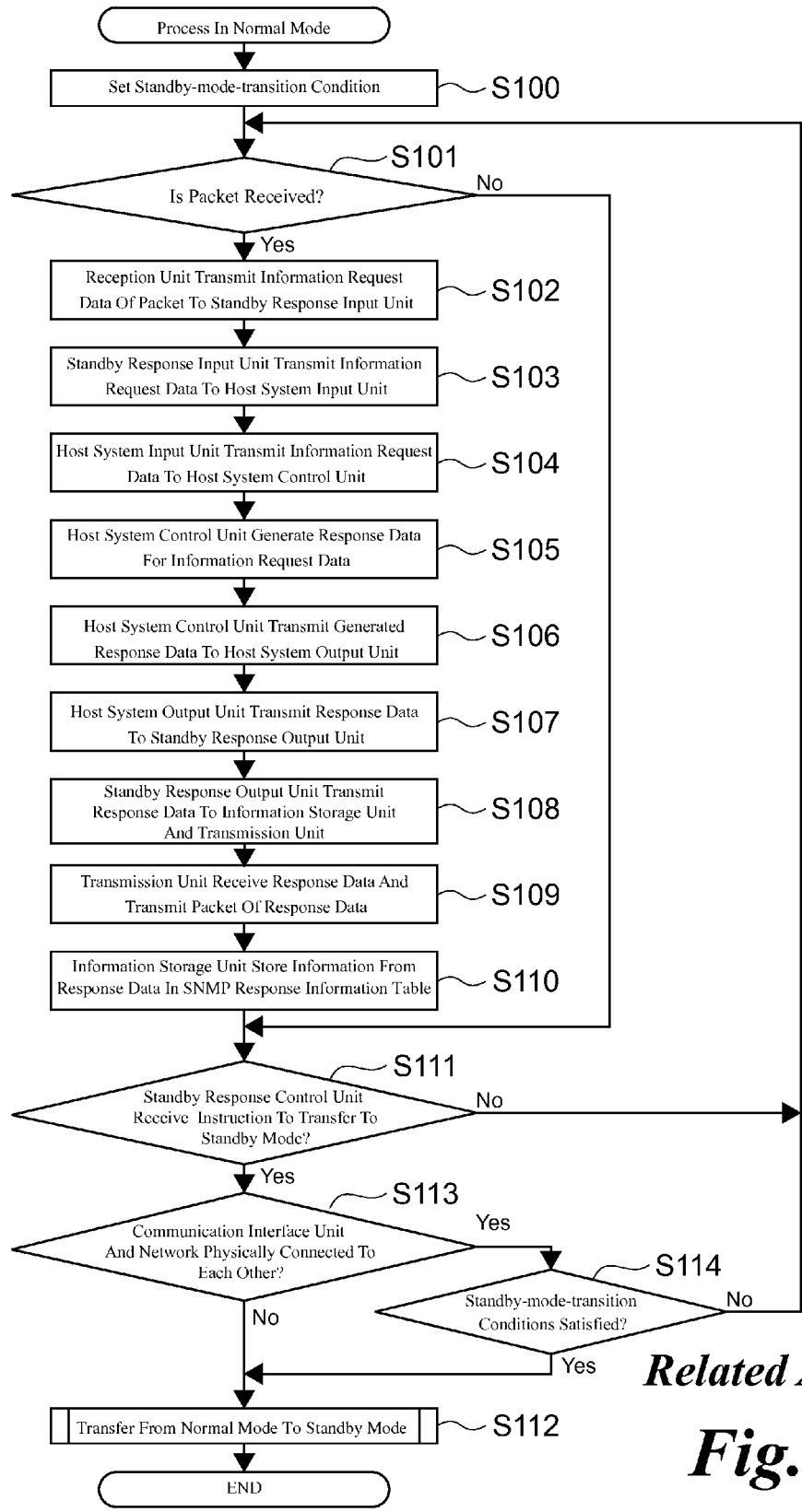
FIG. 8 is a flowchart of a process performed by the second image forming apparatus.

A process performed by the image forming apparatus 100a will now be described. FIG. 8 is the flowchart of the process performed by the image forming apparatus 100a. In addition, among process operations performed by the image forming apparatus 100a, only a process operation in the normal mode is different from the above-described process performed by the first typical image forming apparatus 100. Therefore, only the process operation in the normal mode will be described.

(Step S100)

First, the host system response control unit 111a in the host system 110 instructs the standby-mode-transition control unit 121a in the standby response system 120 to set the standby-mode-transition condition. The set standby-mode-transition condition is stored in the standby-mode-transition condition area 126c within the storage unit 126.

In addition, it is assumed that the setting process for the standby-mode-transition condition is performed at the beginning of the processing operation in the normal mode. However, the setting process may be performed any time as long as the image forming apparatus 100a is in the normal mode.

In addition, even when the setting process is not performed, the default value is set. Therefore, a transition from the normal mode to the standby mode is made.

As described above, it is possible for the user to set the standby-mode-transition condition at an adequate level, in line with the usage environment of the image forming apparatus 100a.

Since the processing operations in a subsequent step S101 to a step S111 are the same as those in the image forming apparatus 100, the description thereof will be omitted.

When, in the step S111, the standby response control unit 121 receives an instruction to transfer to the standby mode (step S111: Yes), the process proceeds to a subsequent step S113.

(Step S113)

Next, the standby response control unit 121 determines whether or not the communication interface unit 130 and the network 300 are physically connected to each other.

If they are connected (step S113: Yes), the process proceeds to a step S114, and a process utilizing the standby-mode-transition condition is performed. If they are not connected (step S113: No), the process proceeds to a step S112, and a process for transferring to the standby mode is performed without using the standby-mode-transition condition.

The reason why it is determined whether or not the communication interface unit 130 and the network 300 are physically connected to each other is that, if a network cable is not physically connected, communication is not performed between the image forming apparatus 100a and the PC 200 even in the normal mode and it is difficult to store information for creating the response data in the standby mode.

By performing the determination in this step, it is possible to perform the determination of the standby-mode-transition condition and to transfer to the standby mode only in a case of being in a state in which communication with the PC 200 is performed.

(Step S114)

Next, the standby-mode-transition control unit 121a compares the extent of information stored in the address information area 126a and the SNMP response information table 126b in the storage unit 126, with the standby-mode-transition condition stored in the standby-mode-transition condition area 126c, and determines whether or not the standby-mode-transition condition is satisfied.

In the process operation performed in this step, if the standby-mode-transition condition stored in the standby-mode-transition condition area 126c is, for example, "an IP address and a MAC address are stored", it is determined whether or not an IP address and a MAC address are stored in the address information area 126a.

In a case where the standby-mode-transition condition is not satisfied (step S114: No), a transition to the standby mode is not made and the normal mode is continued. Therefore, the process returns to the step S101. In a case where the standby-mode-transition condition is satisfied (step S114: Yes), the process proceeds to the step S112, and the process for transferring to the standby mode is performed.

(Step S112)

If, in the step S113, the communication interface unit 130 and the network 300 are not physically connected to each other or if, in the step S114, the standby-mode-transition condition is satisfied, the host system control unit 111 and the standby response control unit 121 perform a process for transferring from the normal mode to the standby mode.

As described above, it is important that the plural standby-mode-transition conditions can be set in order to conform to an environment in which an image forming apparatus is used, in other words, to maintain compatibility with the particular management tool used and the particular information request supported by that management tool.

However, from among the plural settable standby-mode-transition conditions, it is difficult for the user to easily identify one of the standby-mode-transition conditions, tailored to the environment of the user oneself, where the allocation of the state of the standby mode and the state of the normal mode is balanced.

For example, if the standby-mode-transition condition is made too strict, the operating time in the normal mode is inadequately lengthened, and a state in which it is difficult to achieve electric power saving occurs.

In addition, as described above, environments in which image forming apparatuses are used vary and are different. Therefore, it is undesirable to preliminarily define, as a preset value, one of the plural selectable standby-mode-transition conditions.

Furthermore, as for the amount of information the standby response system 120 can learn, there is a restriction on the capacity of the storage unit 126. Therefore, a configuration in which all pieces of information are held so as to be able to deal with any environment is not realistic.

Therefore, in an embodiment of the present disclosure, one of the standby-mode-transition conditions where the allocation of the state of the standby mode and the state of the normal mode are balanced is automatically determined, thereby enabling the user to easily set an adequate one of the standby-mode-transition conditions.

In addition, the present embodiment focuses on the item name (OID) and the item value (data value) used in the SNMP. Therefore, first a management information base (MIB: management information database) referenced in the SNMP will be described.

In a TCP/IP network, the SNMP is a protocol for monitoring and managing a device connected to a network. The monitored and managed device has a management information database called the MIB.

By determining the state of the device with reference to information within the MIB or setting information in the MIB, a management tool to perform monitoring and management performs monitoring and management of the device. Since the management tool is provided by each vendor, various types of management tool exist, and which management tool is used in a user environment in which an image forming apparatus is used is typically decided by an administrator.

The MIB includes a standard MIB specified by Request For Comments (RFC) as a MIB to be commonly installed in devices connected to a network system and an extended MIB (also called a private MIB) uniquely extended by a vendor or the like.

The standard MIB may be divided into several MIBs, depending on the intended use thereof, and a typical one thereamong is a MIB-2. The private MIB expresses unique information necessary for the management tool unique to a vendor to perform monitoring and management.

Figure 9:
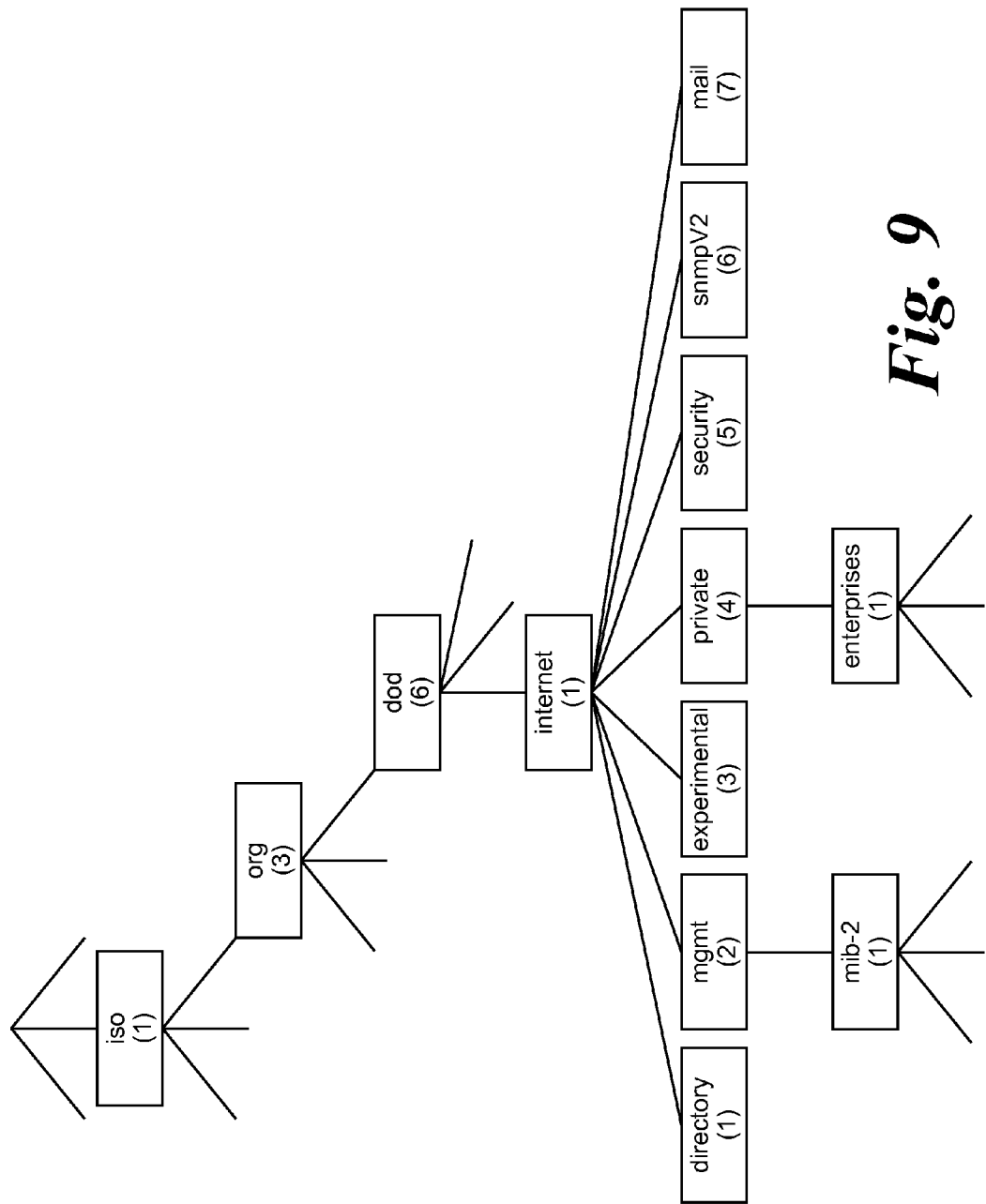
FIG. 9 is a schematic diagram illustrating a tree structure of an MIB.

In the MIB, as illustrated in FIG. 9, pieces of information for monitoring and management are defined as elements, and the elements are managed in a tree structure. Each piece of information stored in the MIB is called an object. An identifier (the item name) called an object ID (OID) is assigned to an object. By specifying the OID, the management tool performs reference to or a setting of information.

By separating numeric characters with periods, the OID is expressed. For example, an OID included in the MIB-2 is expressed by numeric characters of "1.3.6.1.2.1." and periods, in order from the left side. In addition, if in the private MIB, an OID begins with "1.3.6.1.4.1.".

In the image forming apparatus of the present embodiment, the MIB-2 and the private MIB, described above, are used.

Next, grouping many OIDs existing within the private MIB with respect to each corresponding management tool and handling these will be described.

The reason why the OIDs are grouped is that, on the assumption that, for example, a management tool uses OIDs within the MIB-2 and the private MIB in order to monitor and manage an image forming apparatus, the OIDs within the private MIB are distributed at different points within the private MIB without being collected with respect to each vendor.

When the administrator uses a management tool, it takes a significant amount of effort to sort out and use an OID corresponding to that management tool from within the private MIB. Therefore, in the present embodiment, by preliminarily compiling, into one group, OIDs corresponding to each management tool with respect to the corresponding management tool, the load of the administrator is reduced.

Setting the standby-mode-transition condition in stages will now be described. The staged setting corresponds to a specific example of the description of the above-described second typical technology. In the stages set as the standby-mode-transition condition, for example, the following two stages may be provided.

Stage 1: the information of the OIDs within the MIB-2 stored in the SNMP response information table 126b is set as the standby-mode-transition condition.

Only by setting the condition of this stage 1, the standby response system 120 can respond to a basic information request from the management tool.

Stage 2: the information of the OIDs within the MIB-2 and the information of OIDs included in a group within the private MIB stored in the SNMP response information table 126b are set as the standby-mode-transition condition.

Figure 10:
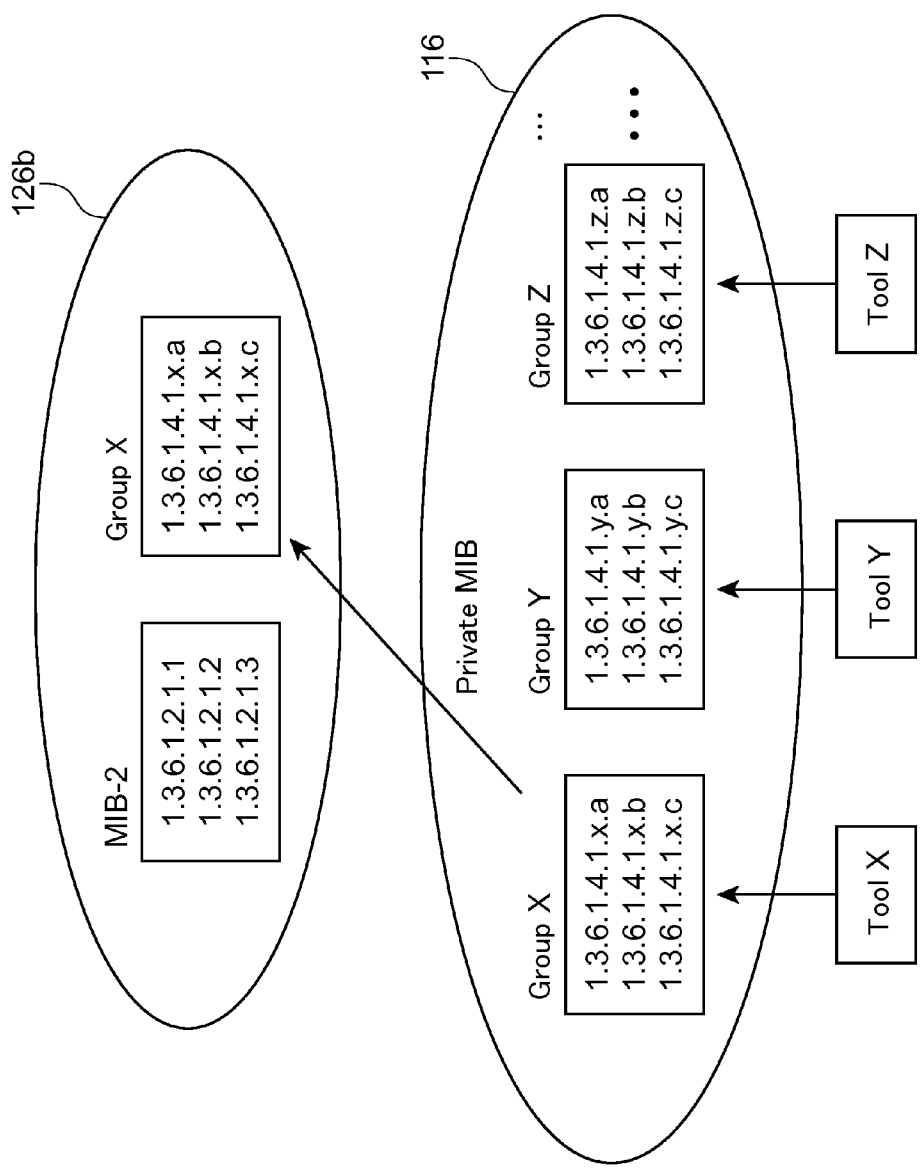
FIG. 10 is a schematic diagram illustrating a process for reshuffling groups.

In addition, when the standby-mode-transition condition of the stage 2 is used, it is necessary for the administrator (user) to recognize that a management tool used to monitor and manage the image forming apparatus in the network system managed by the administrator (user) oneself is a tool X, as illustrated in FIG. 10. In addition, it is necessary to select, from an MIB 116, a group (group X) corresponding to that management tool (tool X) and set the group (group X) in the SNMP response information table 126b.

In addition, while alphabetical characters are used for some OIDs, this is for explanation and different numeric characters are actually entered into the positions of different alphabetical characters.

If the data values of OIDs belonging to the MIB-2 and the group X are acquired, the image forming apparatus is allowed to transfer to the standby mode.

In this way, in a case where the administrator exactly understands which management tool manages the image forming apparatus, and adequately selects a group corresponding to that management tool, if this condition of the stage 2 is used, it is possible to expect adequate responsiveness and energy-saving effect.

However, in a case where the kind of a management tool is changed or an additional management tool is added to the network system, it takes some effort for the administrator to set, in the SNMP response information table 126b, a group corresponding to the modification.

In addition, it is conceivable that the administrator forgets to reshuffle groups in association with the change of the management tool, and in that case, the responsiveness and the energy-saving effect of the image forming apparatus become inadequate.

Therefore, in the present embodiment, in order to solve this problem, the change of the management tool is automatically detected, and reshuffling of groups is automatically performed.

In the present embodiment, in the same manner as in the above-described standby-mode-transition condition of the stage 1, only the satisfying information of the MIB-2 is defined as a transition condition for transferring to the standby mode. By doing so, the condition for transferring to the standby mode is eased, and it becomes easy to transfer to the standby mode, compared with the above-described condition of the stage 2. By making it easy to transfer, it is possible to expect the energy-saving effect.

Next, in the present embodiment, the standby response system totals (tabulates) which group within the private MIB a management tool requests, per unit time (for example, one day or one week), information for an OID of, and the standby response system stores a totaling result in a storage unit. In addition, based on the totaling result, a group for which information requests per unit time exceed a preliminarily defined first threshold value is automatically set in the SNMP response information table 126*b* from the MIB 116. In addition, from the item names of OIDs belonging to the set group, the standby response system can know which data value to acquire and store.

By doing so, it is possible to reduce an effort for group setting by the administrator or prevent the setting of an inadequate standby-mode-transition condition from occurring from the administrator's forgetting to set the group setting. In addition, even if the management tool requests information that does not exist in the MIB-2, it is possible for the standby response system to respond while remaining in the standby mode. Therefore, it is possible to obtain adequate responsiveness. Furthermore, since it is possible to respond without returning from the standby mode, it is possible to obtain an energy-saving effect.

In contrast, if, based on the totaling result, a group for which information requests per unit time are less than or equal to a preliminarily defined second threshold value (the second threshold value may be equal to the first threshold value or different therefrom) is determined and this group has been set in the SNMP response information table 126, this group is deleted from the SNMP response information table 126.

By doing so, it is possible to effectively use the storage unit 126 having a limited capacity.

While, in this way, in the present embodiment, a small amount of information (MIB-2) stored is defined as the standby-mode-transition condition, and data values relating to the groups of the OIDs of the private MIB, which correspond to a management tool to be used, are preliminarily collected, making it is possible to respond to many information requests in the standby mode. Therefore, it is easy to transfer to the standby mode, and it is possible to generate a state of remaining in the standby mode without sacrificing responsiveness.

Figure 11:
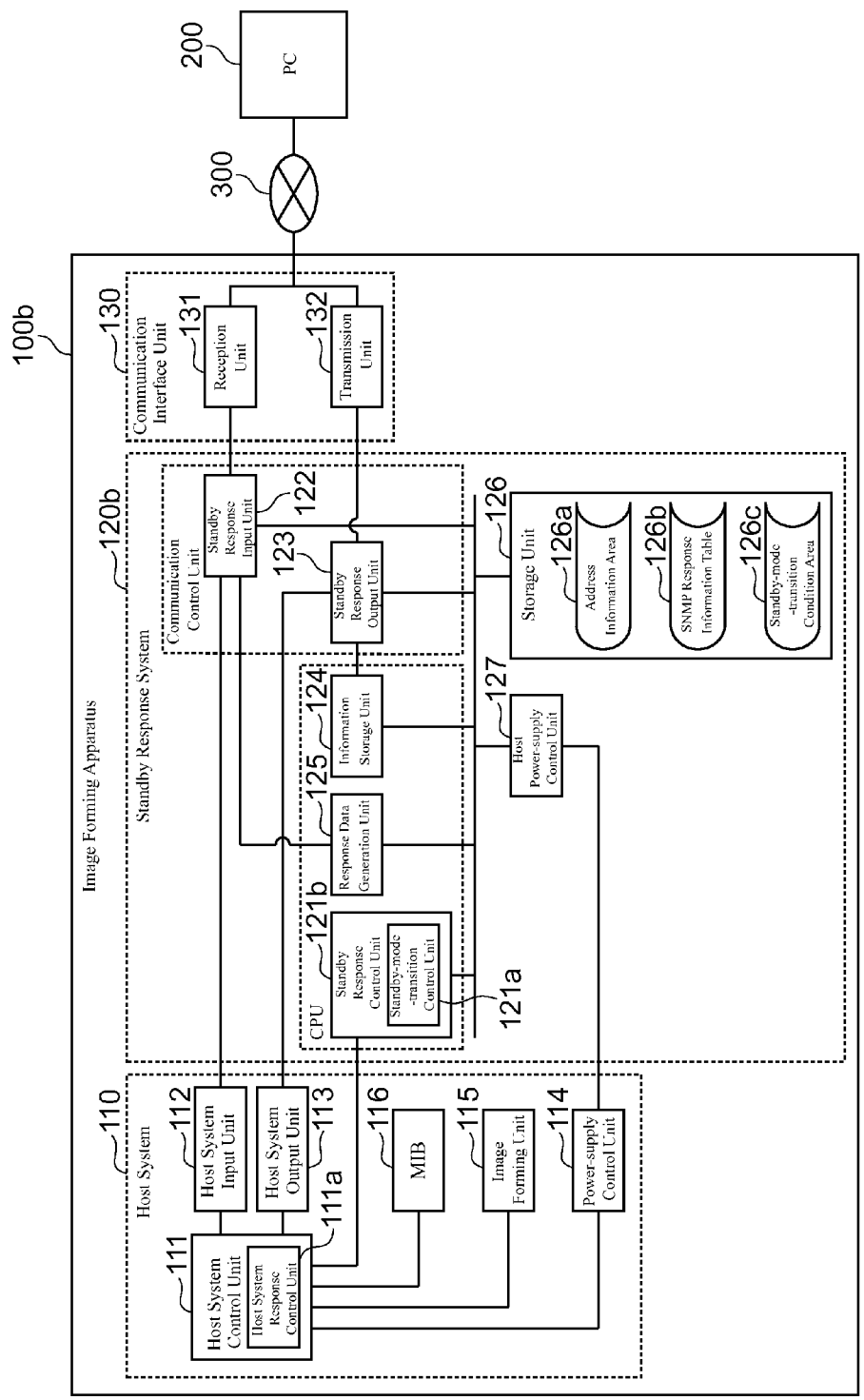
FIG. 11 is a schematic diagram illustrating a configuration of an image forming apparatus of an embodiment of the present disclosure.

FIG. 11 is a schematic diagram illustrating the block configuration of an image forming apparatus 100*b* according to the embodiment of the present disclosure.

The image forming apparatus 100*b* is different from the above-described image forming apparatus 100 or image forming apparatus 100*a* in that, as described above, a standby response control unit 121*b* (the control unit) in a standby response system 120*b* totals information requests per unit time for each group, copies the item of an OID from the MIB 116 to the SNMP response information table 126*b*, based on the totaling result, and deletes OIDs of an unnecessary group, from the SNMP response information table 126*b*.

In addition, the illustration of the MIB 116 is omitted in the image forming apparatuses 100 and 100*a*. One of features of the present embodiment is that OIDs within the private MIB are grouped for each management tool.

Figure 12:
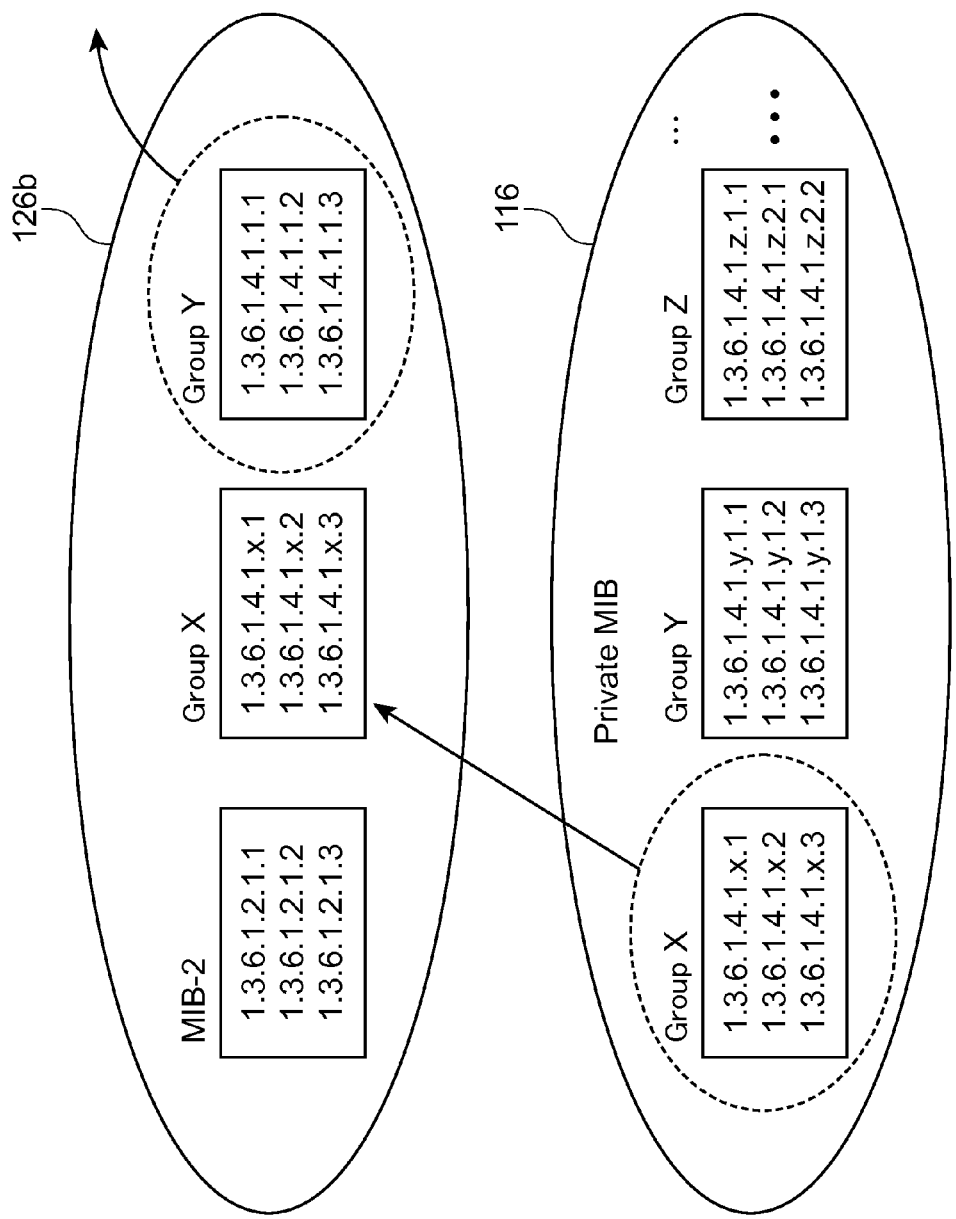
FIG. 12 is a schematic diagram illustrating a process for collectively dealing with OIDs for each group.

Next, a state in which OIDs are collectively dealt with for each group will be described. FIG. 12 is a schematic diagram for explaining the state in which OIDs are collectively dealt with for each group.

As for content illustrated in this drawing, the standby response control unit 121*b* automatically performs the above-described operation in the stage 2.

First, the item names of the MIB-2 are stored in the SNMP response information table 126*b*, and in addition to that, the item names (those of a group Y) of the private MIB are stored therein.

In addition, as the totaling result of information requests, it is assumed that the number of information requests for OIDs belonging to the group X exceeds the first threshold value and the number of information requests for OIDs belonging to the group Y is less than or equal to the second threshold value.

Next, based on the totaling result, the standby response control unit 121*b* causes the item names of OIDs belonging to the group X to be copied to and stored in the SNMP response information table 126*b* from the MIB 116 and deletes the item names of OIDs belonging to the group Y from the SNMP response information table 126*b*.

In addition, in this drawing, while alphabetical characters are used for some of OIDs, this is for explanation and different numeric characters are actually entered into the positions of different alphabetical characters.

Next, a process performed by the image forming apparatus 100*b* in the present embodiment will be described. Descriptions of portions within the process performed by the image forming apparatus 100*b* will be omitted, where they are the same as those of the process performed by the image forming apparatus 100 or the image forming apparatus 100*a*. A portion in which the item names of OIDs for each group are reshuffled and which is a portion added in the present embodiment will be described in the following explanation.

In addition, the following explanation will be divided into three parts, corresponding to the initializing process for the above-described totaling process, the totaling process for each group, and the process for reshuffling groups, based on a totaling result.

Figure 13:
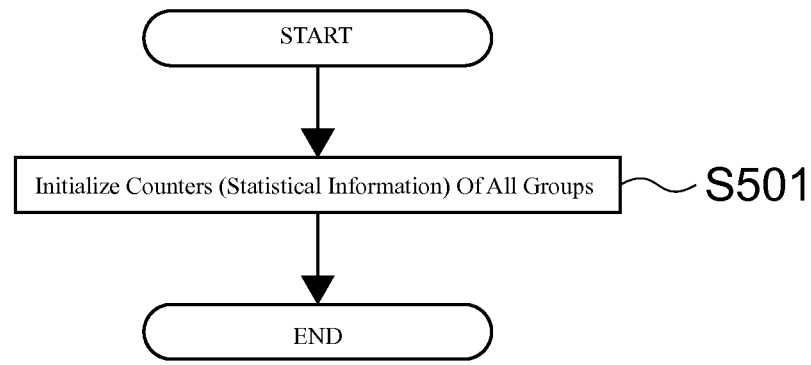
FIG. 13 is a flowchart of initializing a process for totaling.

The initializing process for totaling will now be described. FIG. 13 is the flowchart of the initializing process for totaling.

In a step S501, the standby response control unit 121*b* zeros and initializes counters (statistical information) of all the groups. In addition, this process is performed per unit time preliminarily defined.

Figure 14:
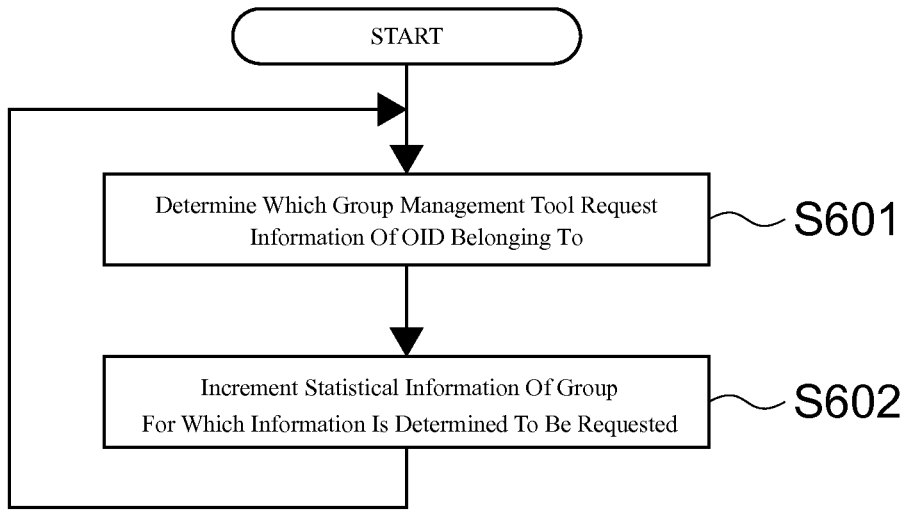
FIG. 14 is a flowchart of process for totaling information requests per unit time for each group.

The process for totaling information requests per unit time for each group will now be described. FIG. 14 is the flowchart of the process for totaling information requests per unit time for each group.

First, the standby response control unit 121*b* determines the pertinent group for an OID for which the management tool requests information (step S601).

Next, the standby response control unit 121*b* increments the statistical information of a group for which information is determined to be requested in the previous step (step S602).

In addition, these processing operations are repeated on a continuous basis during a time period during which the image forming apparatus 100*b* operates.

Figure 15:
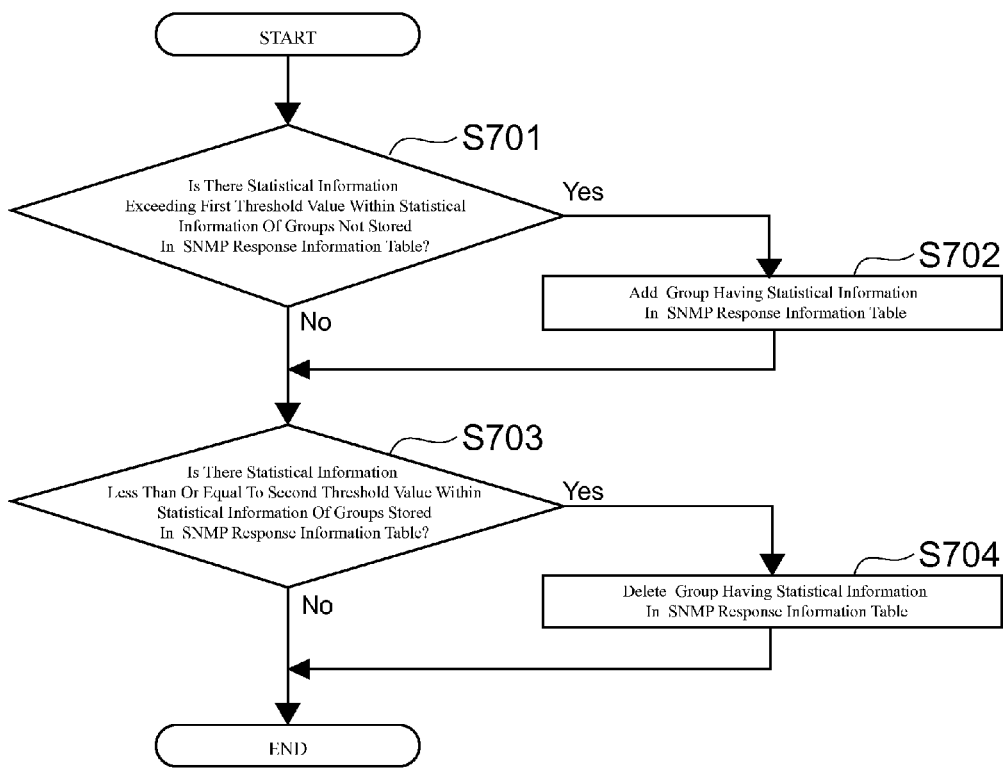
FIG. 15 is a flowchart of process for reshuffling groups.

The process for reshuffling groups, based on a totaling result, will now be described. FIG. 15 is the flowchart of the process for reshuffling groups, based on the totaling result.

First, the standby response control unit 121*b* determines whether or not there is a piece of statistical information exceeding the first threshold value, within the statistical information of groups not stored in the SNMP response information table 126*b* (step S701).

If there is a piece of statistical information exceeding the first threshold value (step S701: Yes), the standby response control unit 121*b* adds, to the SNMP response information table 126b, a group having the piece of statistical information exceeding the first threshold value (step S702).

If there is no piece of statistical information exceeding the first threshold value (step S701: No), the process proceeds to a subsequent step.

Next, the standby response control unit 121b determines whether or not there is a piece of statistical information less than or equal to the second threshold value, within the statistical information of groups stored in the SNMP response information table 126b (step S703).

If there is a piece of statistical information less than or equal to the second threshold value (step S703: Yes), the standby response control unit 121b deletes, from the SNMP response information table 126b, a group having the piece of statistical information less than or equal to the second threshold value (step S704).

If there is no piece of statistical information less than or equal to the second threshold value (step S703: No), the standby response control unit 121b does nothing.

In addition, this process for reshuffling may be performed at any time. For example, in the above-described typical technology, this process for reshuffling may be performed when the instruction to transfer to the standby mode is received (step S111: Yes) or may be performed when one unit time finishes and a totaling result is completed.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming apparatus having a normal mode and a standby mode, comprising:
   a first response unit that transmits a response including information corresponding to a requests received from a management tool that manages the image forming apparatus in the normal mode, via a network; and
   a second response unit that transmits the response in place of the first response unit in the standby mode, the response including the information that is stored in a simple network management protocol (SNMP) response information table in the normal mode,
   wherein the SNMP information table includes an Object Identifier (OID) of the information and data corresponding to the OID,
   wherein the OID distinguishes an object of the information stored in a management information base (MIB) specified by an SNMP, and the data corresponding to the OID has a type and data value,
   wherein the MIB includes a standard MIB specified by Request For Comments (RFC) and a private MIB uniquely extended by a vendor, the standard MIB including a MIB-2, and
   wherein the second response unit (i) groups the OIDs within the private MIB for each of the management tools, (ii) totals a number of the requests per unit time for each of the management tools, (iii) if the number of the requests for OIDs belonging to a first group within the private MIB exceeds a first threshold value, causes the OID corresponding to the request to be stored in the SNMP response information table, (iv) if the number of the requests for OIDs belonging to a second group within the private MIB is less than or equal to a second threshold value, causes the OID corresponding to the request to be deleted in the SNMP response information table, (v) causes the data corresponding to the OID within the private MIB to be stored in the SNMP response information table, from among the information included in the response transmitted by the first response unit in the normal mode, and (vi) restricts power supply to the first response unit and transfers to the standby mode, in a case where the information of the OIDs within the MIB-2 stored in the SNMP response information table is set.

2. A response method for an image forming apparatus having a normal mode and a standby mode,
   the image forming apparatus including (i) a first response unit that transmits a response including information corresponding to a request received from a management tool that manages the image forming apparatus in the normal mode, via a network, and (ii) a second response unit that transmits the response in place of the first response unit in the standby mode, the response including the information that is stored in a simple network management protocol (SNMP) response information table in the normal mode,
   wherein the SNMP response information table includes an Object Identifier (OID) of the information and data corresponding to the OID,
   wherein the OID distinguishes an object of the information stored in a management information base (MIB) specified by an SNMP, and the data corresponding to the OID has a type and data value, and
   wherein the MIB includes a standard MIB specified by Request For Comments (RFC) and a private MIB uniquely extended by a vendor, the standard MIB including a MIB-2,
   the response method comprising:
   via the second response unit,
   grouping the OIDs within the private MIB for each of the management tools,
   totaling a number of the requests per unit time for each of the management tools, causing, if the number of the requests for OIDs belonging to a first group within the private MIB exceeds a first threshold value, the OID corresponding to the request to be stored in the SNMP response information table,
   causing, if the number of the requests for OIDs belonging to a second group within the private MIB is less than or equal to a second threshold value, the OID corresponding to the request to be deleted in the SNMP response information table,
   causing the data corresponding to the OID to be stored in the SNMP response information table, from among the information included in the response transmitted by the first response unit in the normal mode, and
   restricting power supply to the first response unit and transferring to the standby mode, in a case where the information of the OIDs within the MIB-2 stored in the SNMP response information table is set.

3. A non-transitory computer-readable medium having instructions stored thereon, upon execution by at least one processor in an image forming apparatus having a normal mode and a standby mode,
   the image forming apparatus including (i) a first response unit that transmits a response including information corresponding to a request received from a management tool that manages the image forming apparatus in the normal mode, via a network, and (ii) a second response unit that transmits the response in place of the first response unit in the standby mode, the response including the information that is stored in a simple network management protocol (SNMP) response information table in the normal mode, wherein the SNMP response information table includes an Object Identifier (OID) of the information and data corresponding to the OID, wherein the OID distinguishes an object of the information stored in a management information base (MIB) specified by an SNMP, and the data corresponding to the OID has a type and data value, and wherein the MIB includes a standard MIB specified by Request For Comments (RFC) and a private MIB uniquely extended by a vendor, the standard MIB including a MIB-2, the instructions cause the image forming apparatus to perform instructions comprising:

via the second response unit, grouping the OIDs within the private MIB for each of the management tools, totaling a number of the requests per unit time for each of the management tools, causing, if the number of the requests for OIDs belonging to a first group within the private MIB exceeds a first threshold value, the OID corresponding to the request to be stored in the SNMP response information table, causing, if the number of the requests for OIDs belonging to a second group within the private MIB is less than or equal to a second threshold value, the OID corresponding to the request to be deleted in the SNMP response information table, causing the data corresponding to the OID to be stored in the SNMP response information table, from among the information included in the response transmitted by the first response unit in the normal mode, and restricting power supply to the first response unit and transferring to the standby mode, in a case where the information of the OIDs within the MIB-2 stored in the SNMP response information table is set.

\* \* \* \* \*